(12) United States Patent
Halpenny-Mason et al.

(10) Patent No.: US 12,013,458 B2
(45) Date of Patent: Jun. 18, 2024

(54) PRECISE REGISTRATION OF IMAGES OF TUBULARS

(71) Applicant: DarkVision Technologies Inc., North Vancouver (CA)

(72) Inventors: Michael Halpenny-Mason, Vancouver (CA); Connor Vandenberg, Vancouver (CA); Kelvin Wong, New Westminster (CA)

(73) Assignee: DarkVision Technologies Inc., North Vancouver (CA)

( * ) Notice: Subject to any disclaimer, the term of this patent is extended or adjusted under 35 U.S.C. 154(b) by 382 days.

(21) Appl. No.: 17/519,578

(22) Filed: Nov. 5, 2021

(65) Prior Publication Data

US 2022/0179068 A1   Jun. 9, 2022

(30) Foreign Application Priority Data

Dec. 7, 2020 (GB) .................................. 2019246

(51) Int. Cl.
   *G01S 15/00* (2020.01)
   *G01S 15/58* (2006.01)
   *G01S 15/86* (2020.01)
   *H04N 7/18* (2006.01)

(52) U.S. Cl.
   CPC ............ *G01S 15/86* (2020.01); *G01S 15/582* (2013.01); *G01S 15/586* (2013.01); *H04N 7/18* (2013.01)

(58) Field of Classification Search
   CPC .... E21B 47/0025; E21B 47/08; E21B 23/001; E21B 47/14; G01S 15/582; G01S 15/89; G01S 15/60; H04N 23/45; H04N 23/555
   See application file for complete search history.

(56) References Cited

U.S. PATENT DOCUMENTS

| | | | | |
|---|---|---|---|---|
| 4,050,071 A | * | 9/1977 | Clorfeine | G01S 13/60 342/117 |
| 6,445,337 B1 | * | 9/2002 | Reiche | G01S 13/60 180/197 |
| 2005/0145415 A1 | * | 7/2005 | Doering | E21B 4/18 175/24 |
| 2009/0101337 A1 | * | 4/2009 | Neidhardt | E21B 47/08 166/250.01 |
| 2011/0280293 A1 | * | 11/2011 | Chevalier | G01S 7/292 375/224 |
| 2019/0100992 A1 | * | 4/2019 | Glasgow, Jr. | E21B 45/00 |
| 2019/0101663 A1 | * | 4/2019 | Walters | G01V 1/44 |
| 2021/0088546 A1 | * | 3/2021 | Helmore | E21B 47/04 |
| 2023/0362499 A1 | * | 11/2023 | Robinson | H04N 23/951 |

FOREIGN PATENT DOCUMENTS

| | | |
|---|---|---|
| CN | 111927434 A | 11/2020 |
| GB | 2497517 A | 6/2013 |
| WO | 2009137701 A2 | 11/2009 |
| WO | 2019162642 A1 | 8/2019 |

* cited by examiner

*Primary Examiner* — Li Liu

(57) ABSTRACT

A device and method used to image conduits, such as pipes, wellbores and tubulars, with imaging sensors, such as cameras and ultrasound arrays. The speed and location of the device are determined using one or more speed sensor modules. Images are then registered to more precise axial locations along the conduit than are normally possible using wireline encoders or other methods. The conduit may be visualized to proper scale for improved analysis of defects.

20 Claims, 11 Drawing Sheets

$$S_t = \text{Tool Speed}$$

$$f_d = \text{Dopplar Freqency}$$

$$\alpha = \text{Probe Angle}$$

$$S_t(f_d) = \frac{\lambda \cdot f_d}{2} \cdot \frac{1}{\cos \alpha}$$

Fig. 5

PRECISE REGISTRATION OF IMAGES OF TUBULARS

RELATED APPLICATIONS

The present application claims priority to United Kingdom Patent Application No. 2019246.4, filed Dec. 7, 2020, which is incorporated herein by reference in its entirety.

TECHNICAL FIELD

The disclosure relates generally to imaging of fluid-carrying conduits, in particular, speed measurement for acoustic sensors in oil & gas wells, water wells, geothermal wells, water mains or pipelines.

BACKGROUND ART

In fluid carrying tubulars, such as oil wells and water delivery infrastructure, there often arises a need to inspect the internal structure for integrity or obstructions. For example, hydrocarbons in production casing may contaminate ground water if there are cracks or deformations in the casing. Similarly, water resources may be lost to leaks in water mains. Ultrasound sensors and cameras are known ways of imaging such structures to detect problems thus protecting the environment.

However, as image quality and resolution increases, it becomes more important to determine the precise location of features imaged. This is needed to locate the spot where some defect was found and to visualize the tubular. These fluid tubulars may be many kilometers long, which makes precise location very difficult.

In current systems, imaging tools are moved through the tubulars using wireline, coiled tubing, tractoring or fluid pressure. These systems are built for force, not precision, typically using only a wheel encoder to estimate the deployment amount. On top of any encoder issues, there are dynamics in the imaging tool and deployment system, such as stick-slip, stretch and oscillations. More advanced tools may have accelerometers on-board to record acceleration data, which are integrated to get velocity data and further integrated to get location data. However, these inference calculations tend to be too imprecise for high resolution imaging registration, especially given noise, drift and temperature artefacts of such sensors.

SUMMARY

To address the shortcomings of current tools, a new imaging tool and method are provided that accurately track the speed and location of the tool with respect to the tubing while imaging.

In accordance with a first aspect of the disclosure there is provided a method of imaging a fluid conduit, comprising: deploying and moving an imaging device axially through the conduit; transmitting an acoustic wave axially and radially outward towards a surface of the conduit using an acoustic sensor operating in Doppler mode; receiving a reflected wave from the surface using the acoustic sensor to generate reflection data; processing the reflection data in Doppler mode to determine a relative speed of the wall with respect to the imaging device; capturing images of the conduit using an array of imaging sensors at a plurality of frames; and using the determined relative speed to estimate distances between frames of the images.

In accordance with a second aspect of the disclosure there is provided an imaging device for a fluid conduit comprising: an array of imaging sensors for capturing images; at least one acoustic sensor facing axially and radially outward. There is a processing circuit arranged to: a) drive the acoustic sensor; b) receive a reflected wave to generate reflection data; c) process the reflection data in Doppler mode to determine a relative speed of the device; and d) determine distances between frames of the captured images.

Further aspects of the disclosure are set out below and in the appended claims. Thus preferred embodiments of the disclosure enable the device to image conduits, such as pipes and wells over long distances, providing the image data for real-time monitoring or subsequent visualization.

BRIEF DESCRIPTION OF THE DRAWINGS

Various objects, features and advantages of the disclosure will be apparent from the following description of embodiments of the disclosure, as illustrated in the accompanying drawings. The drawings are not necessarily to scale, emphasis instead being placed upon illustrating the principles of various embodiments of the disclosure.

FIG. 5 is an equation to compute axial velocity of the tool.

DETAILED DESCRIPTION OF THE PREFERRED EMBODIMENTS

With reference to the accompanying figures, devices and methods are disclosed for inspecting a fluid-carrying tubular conduit by imaging tool with precise speed and location registration. This tubular may be a well/pipe for carrying hydrocarbons or water and having an elongate, cylindrical form factor through which the device can move longitudinally. The device typically also has an elongate form factor and is sized to be deployable within the tubular. The imaging tool comprises at least one imaging sensor for inspecting the tubular and a Doppler speed sensor for determining logging speed. A processor uses the determined speed to register the location of sensor readings.

The imaging sensor may be an optical sensor array, ultrasound transducer array, array of calipers, x-ray sensor array, magnetic flux sensor array or eddy current sensor array. The speed sensor may be an ultrasound transducer operating in Doppler mode and provided as: a single transducer element for both transmitting and receiving in pulse echo mode; a pair of transmit/receive transducers in pitch-catch mode; or an array of such transducers. The Doppler transducers may operate in continuous wave (CW) or pulsed wave (PW) mode and the received signals may be processed to determine the relative speed of the tubular with respect to the tool, which is moving through the tubular.

The overall system may employ additional speed sensors in the form of accelerometers and encoders (on the wireline or on wheels engaging the tubular walls). As discussed, these speed sensors have certain problems but may nonetheless be used to check and scale the Doppler speed measurements. Over longer term, wireline wheel encoders may be quite accurate and so these encoders may be used to scale Doppler measurements using the encoder after many kilometers, especially when the tool is moving below its CW speed threshold.

$$d_{encoder} = \int (s_{doppler} + e_{doppler})dt + \sum_{i=1}^{n_{low}} d_i$$

where:
  $d_{encoder}$ is the measured encoder distance, $S_{doppler}$ is the speed measured using the doppler data, $e_{doppler}$ is the error in the speed measurement, $n_{low}$ is the number of low speed intervals where tool speed is below the low speed cutoff for doppler measurement, $d_i$ is the distance travelled as measured by the encoder during the low speed intervals.

Figure 1:
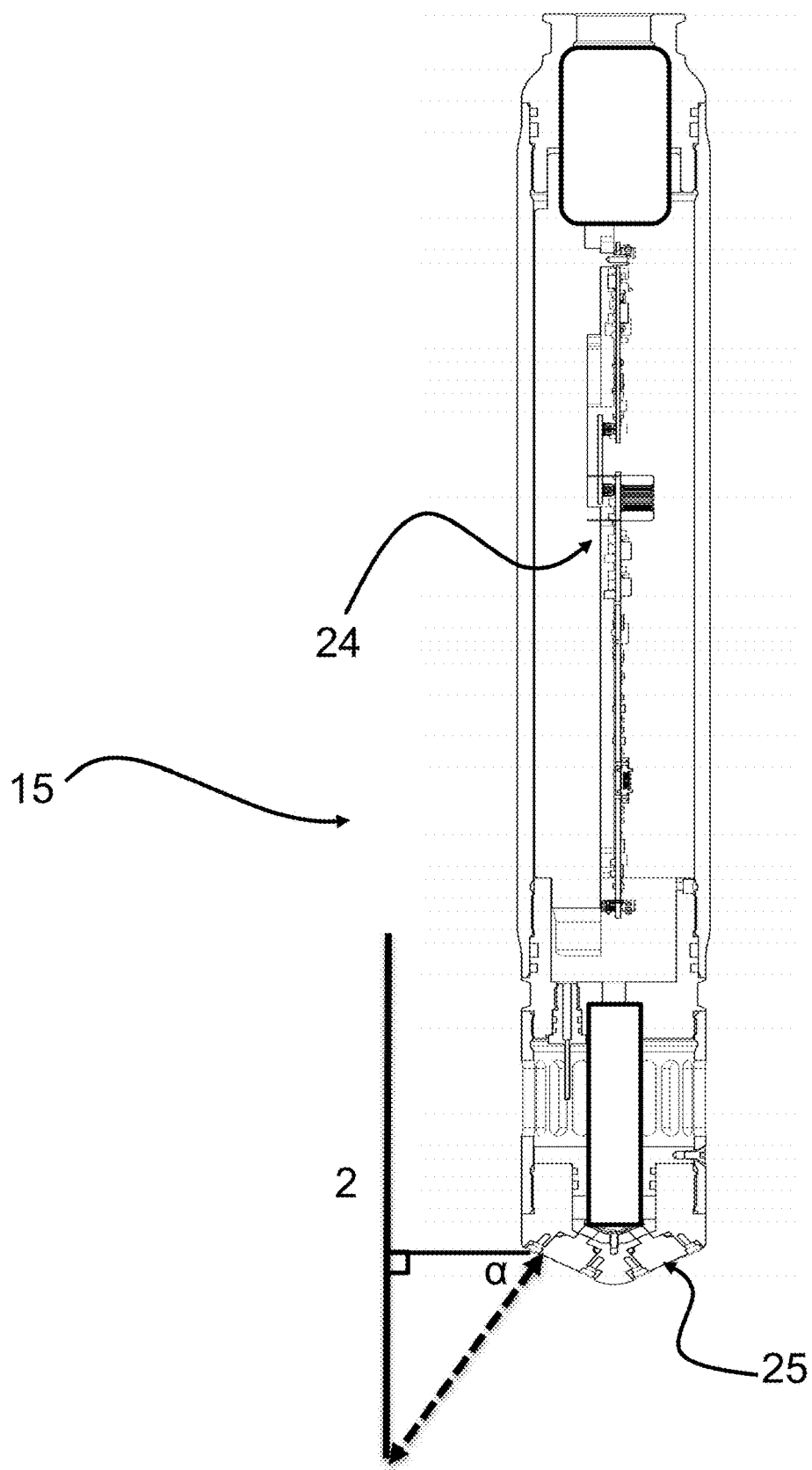
FIG. 1 is a cross-sectional view of a speed sensor tool.
Figure 2:
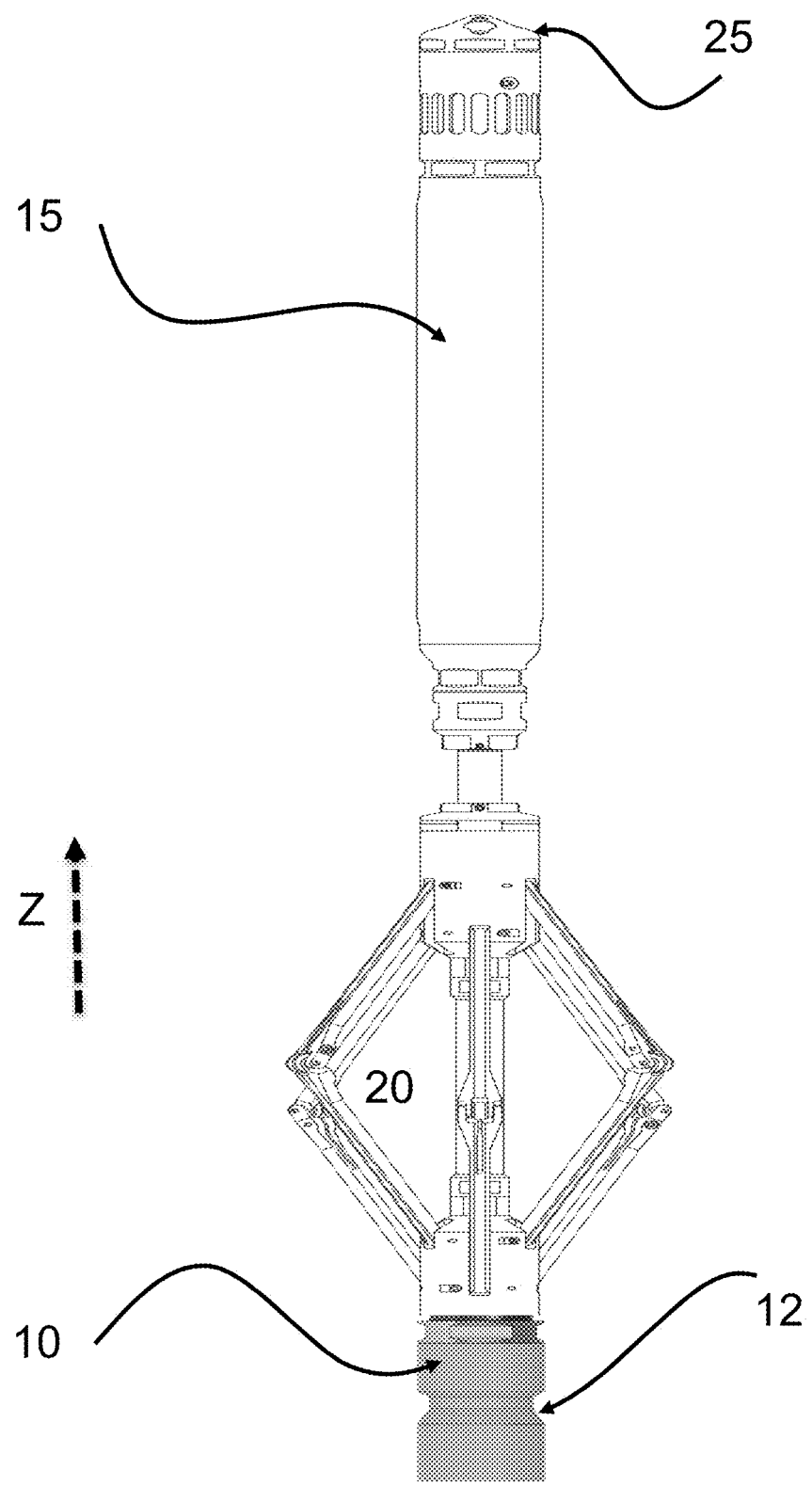
FIG. 2 is a perspective view of an imaging tool.

As shown in FIGS. 1 and 2, the overall tool may comprise 1) an imaging tool 10 having an imaging sensor 12 connected to 2) a speed sensor module 15 having a Doppler speed sensor 25 and speed of sound sensor 28.

Figure 3A:
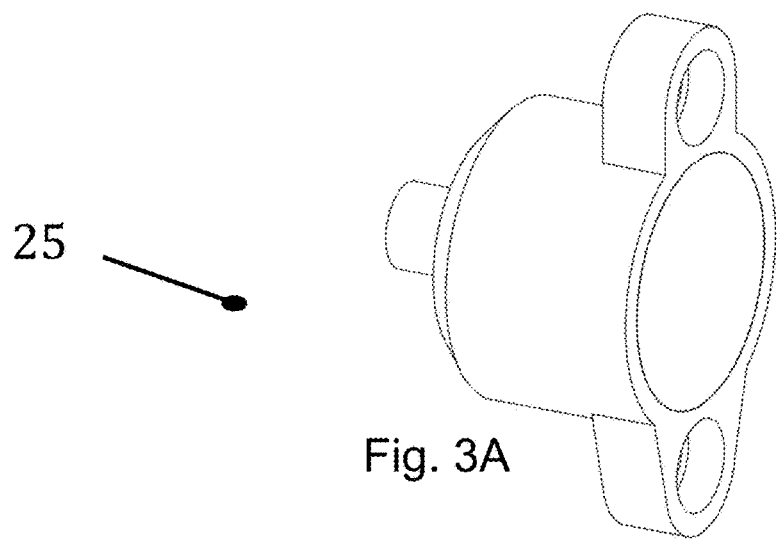
FIG. 3A is a perspective view of an ultrasound transducer.
Figure 3B:
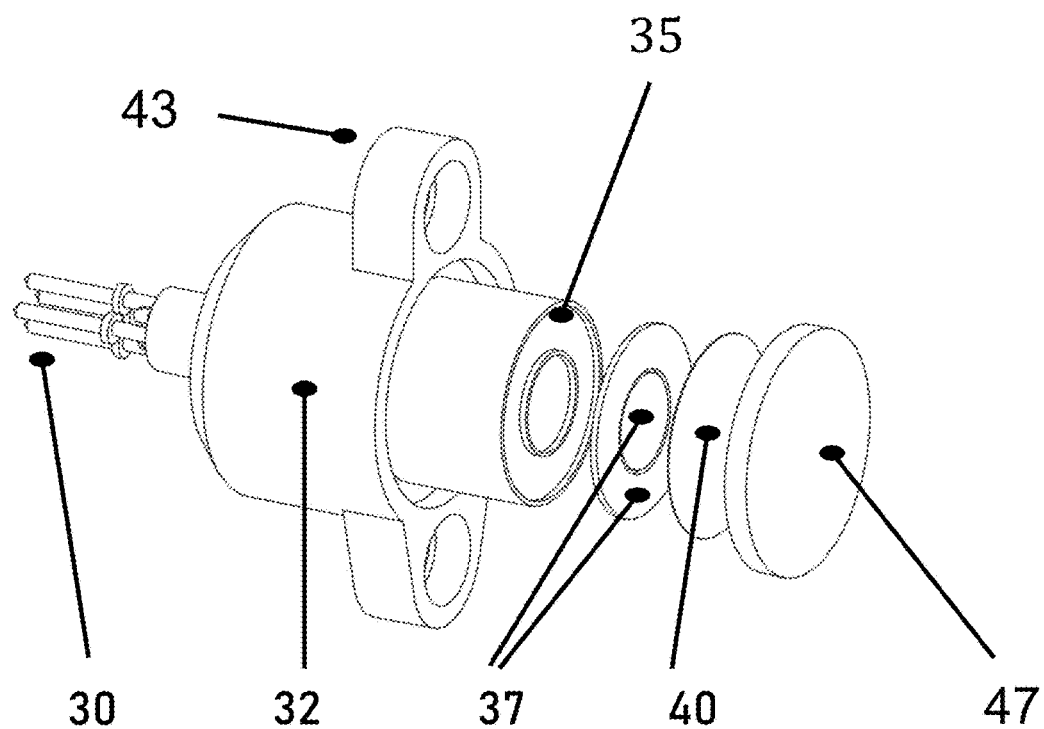
FIG. 3B is an exploded view of an ultrasound transducer.

The Doppler speed sensor 25 is shown in FIG. 3A, which is installed in the speed module 15, as shown in FIG. 1. The sensor 25 may be assembled as shown in FIG. 3B from PEEK housing 32, backing layer 35, PZT 37, Matching layer 40, and Lens 47.

The PZT disc 37 provides a common substrate that is diced into separate receive and transmit elements. Electrodes (not shown) separately connect to the receive and transmit elements, and electrode leads 30 extend to the circuit within the speed module 15. The transducer elements of PZT 37 are shown as concentric rings but other geometries would work (e.g. side-by-side). This simplifies the manufacturing and aligns the transmit and receive transducers in the same direction.

The Doppler Speed Module may operate in Continuous Pulsed (CW) or Pulsed Wave (PW) modes. The transmitter is aimed at the surface of the tubular at a location axially ahead or behind the sensor (e.g. uphole/upstream or downhole/downstream for the pipe, casing or well). As shown by the circuit in FIG. 9 the received acoustic signal becomes an electrical signal by the receiver transducer. The electrical signal is processed by a signal processor to compute frequency changes and determine an axial speed of the tool with respect to the wall.

It will be appreciated that some overlap of CW and PW modalities are conceptually possible. For example, a Continuous Wave may be transmitted and received for a certain period, turned off and repeated. Thus the duty cycle may vary from pure CW to PW.

As the angle of angle of incidence increases, the strength of the returning signal decreases but the axial speed component increases. So, although, a purely outward wave (zero incidence angle) would return most of the signal, any calculated speed would be the lateral movement of the tool in the tubular. A wave aimed purely axially (90° incidence) is useful for picking up fluid speed but not relative tool-tubular speed.

An angle of incidence between 30 and 70°, preferably between 50 and 60°, provides an optimal signal for determining axial speed of the tool-tubular (see FIG. 1). The axial velocity $V_a$ component can be computed, using trigonometry, from the Doppler velocity $V_d$ along the scan line.

Figure 9:
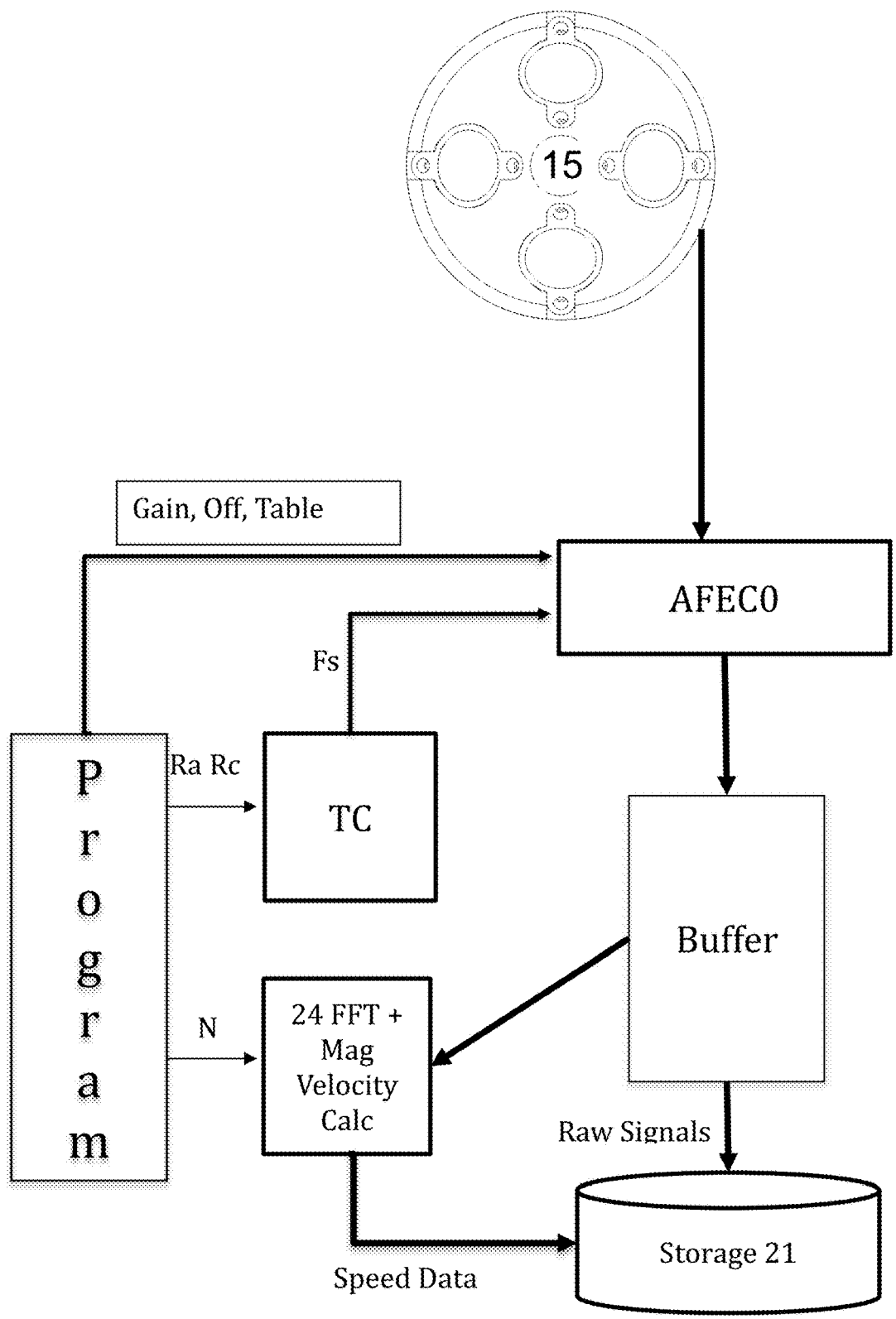
FIG. 9 is a block diagram of circuit components of the speed module.

In CW-mode, each Doppler Speed Sensor may comprise a transmitter/receiver pair, electrically and physically arranged such that a driver circuit drives the transmitter transducer continuously at a selected frequency $f_o$, towards the tubular wall. As illustrated by the circuit of FIG. 9, the onboard program and controller (AFECO) set parameters (i.e. gain, offsets, phase delay tables) for controlling transmitting and receiving. There may be multiple transmitter-receiver pairs 25. The receiver transducer outputs an electrical signal $f_r$ from the reflected signal, which buffered and then stored in raw form. The FFT—Velocity processor takes the buffered raw signal and applies the digital and analog sign processing of FIG. 11 for each window of size N, which is set by the program.

Figure 11:
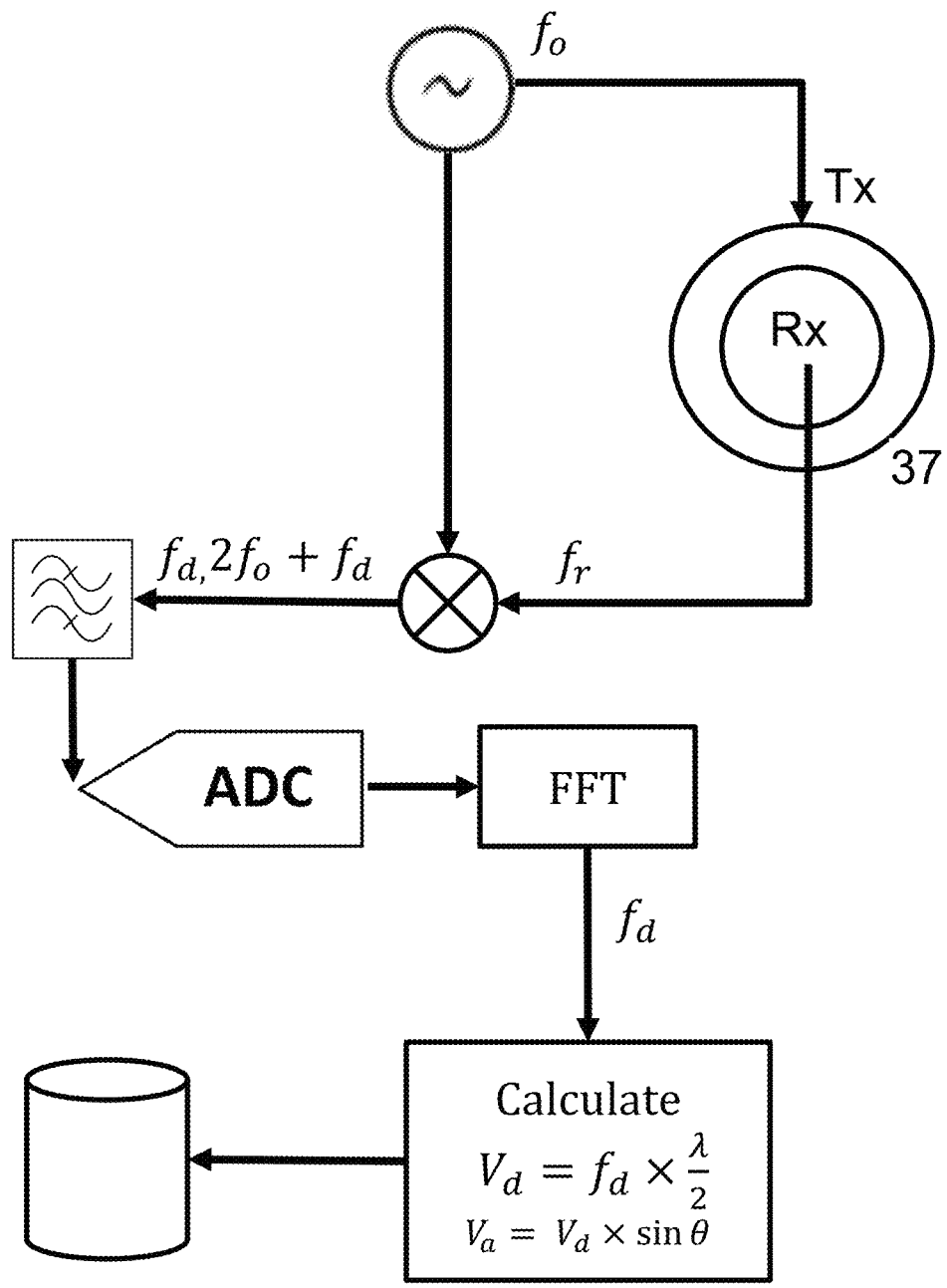
FIG. 11 is a block diagram of processes of the speed module.

As illustrated in FIG. 11, the received signed is demodulated with the transmitted signal using a frequency mixer, resulting in frequency components for the Doppler frequency $f_d$ and harmonics of the transmitted frequency. A bandpass filter removes DC and jitter noise on the lower end and the harmonics at the upper end, leaving the Doppler component(s). An analog-to-digital converter (ADC) converts these components to the digital domain, where the speed module's processor may compute a Fast Fourier Transform (FFT). The dominant frequencies of the FFT should correspond to the velocity Vd, from which axial $V_a$ and radial components are determined using trigonometry.

The Doppler calculation depends on the wavelength and the speed of sound in the fluid. Thus the speed tool may further comprise means for Speed of Sound (SoS) and temperature sensing. FIG. 1 shows the SoS sensor 28 incorporated into a chamber of the speed module 15. The sensor 28 measures the time-of-flight of an acoustic wave travelling through fluid that is free to pass through the chamber.

Figure 4:
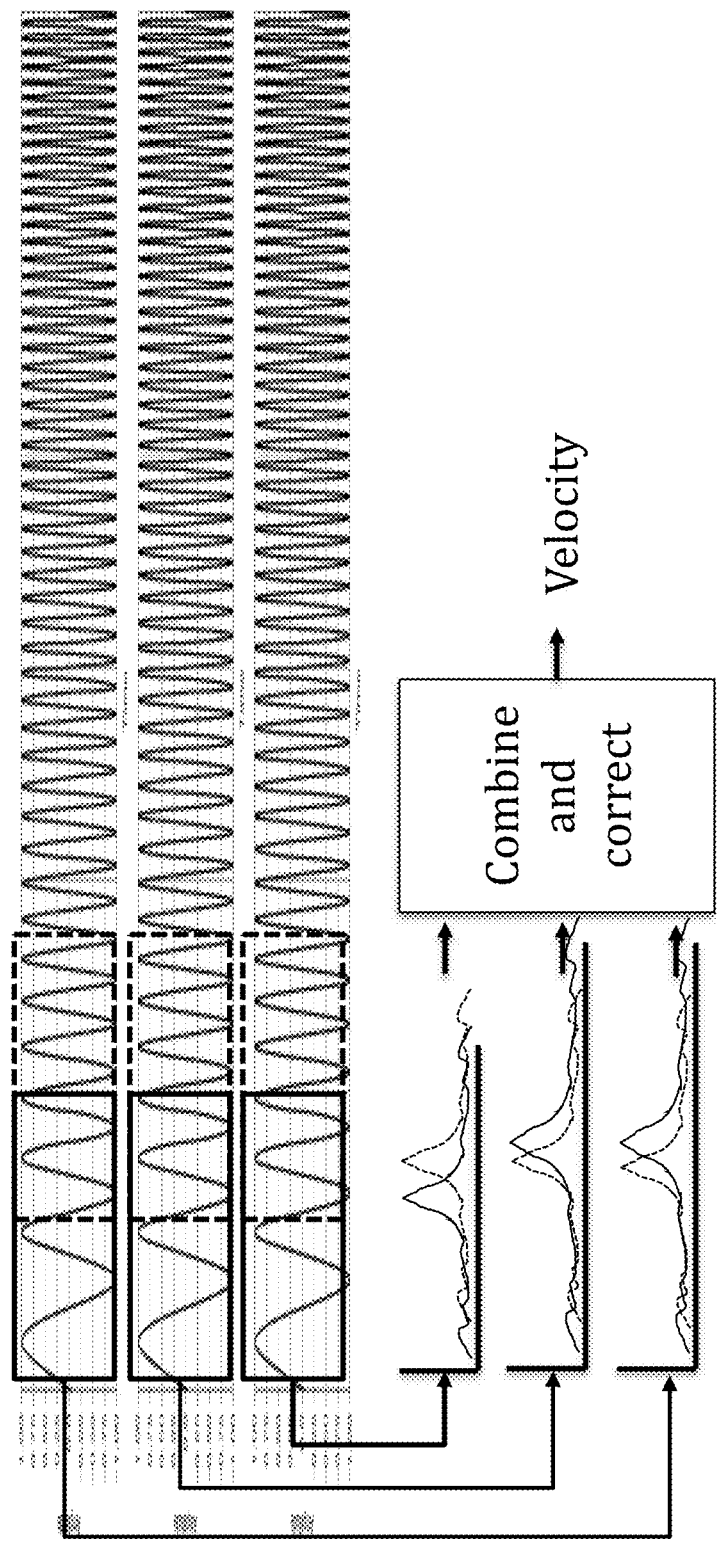
FIG. 4 is diagram of ultrasound data and its processing.

FIG. 4 illustrates speed data and computations. The top charts are raw waveforms from each of three Doppler Speed Sensor 25 with sliding time windows. For each sensor, over each time window, the received signal is modulated with the original Tx frequency and the result converted using the Doppler shift equation in FIG. 5 to velocity values for (below). These three velocities are then combined and corrected to output an estimated, average tool velocity at each timestamp, which may be separated into axial and lateral components.

The conversion from received signal frequency Fd to axial speed St may be made using the equations of FIG. 12. As an example, a 5 Mhz Tx signal is transmitted through water at Speed of Sound 1500 m/s and angle of α=33°. The wavelength is thus 0.00028 meters. The received signal Fr is multiplied by Fo to get Doppler frequency Fd of say, 2 KHz, which indicates a tool speed of 20 m/min. This suggests a low pass filter of at least 2 Khz, preferably 4 KHz to capture the normal movement speed of the wireline or PIG. The High pass limit depends on the stability of sine wave generator. An example band pass filter of 100-2500 Hz would capture speeds of 2-25 m/min, typical of such operations.

The imaging tool 10 or speed module 15 may further comprise accelerometers, as known in the art, to measure acceleration in the axial and both transverse directions. Acceleration can be integrated over time to determine a relative velocity, which velocity may further be integrated over time to determine a relative location. The processor may compare these measurements to the Doppler measurements for the purpose of calibration, sense checking, and redundancy.

Registration

During logging, the imaging and registration/speed sensor data are stored in memory with timestamps. This data may be uploaded to storage on an operator's computer or cloud system in real-time or after the imaging job is complete. The latter is preferred and used for "memory tools" where there is no communication with the surface during logging.

A processor performs registration, typically in post-processing, by assigning a precise axial location (aka depth) to frames (or voxels) for the imaging data using the registration sensor. This may be an estimate of displacement between successive frames, displacement over several frames, or between certain important/key frames. Starting from some datum in the logging (i.e. time zero, location zero), the processor uses the determined axial speeds at plural timestamps, integrates those speeds over the time difference to determine relative distance moved from one timestamp to the next. Thus starting from the datum, the system can estimate the relative location of the tool for plural timestamps.

Improvements in the speed and location estimations may be made using plural Doppler sensors, a Speed-of-Sound sensor, accelerometers and the wireline encoder. These additional sensors provide redundancy, robustness and the ability to cancel out certain other speed artifacts.

Figure 10A:
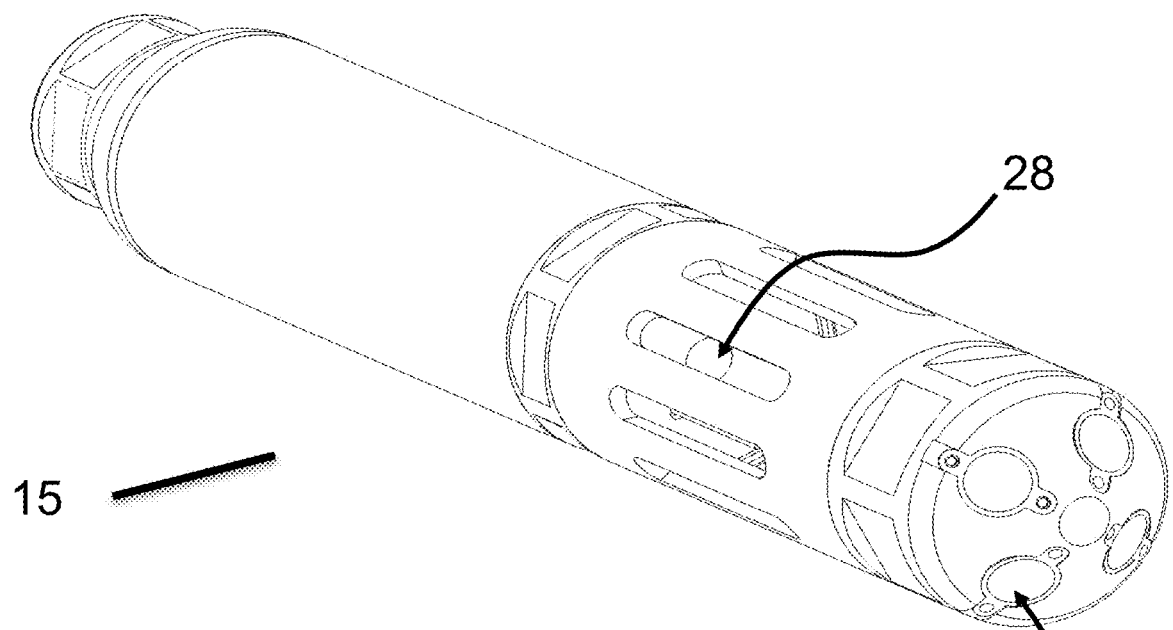
FIG. 10A is a perspective view of a Speed Module
Figure 10B:
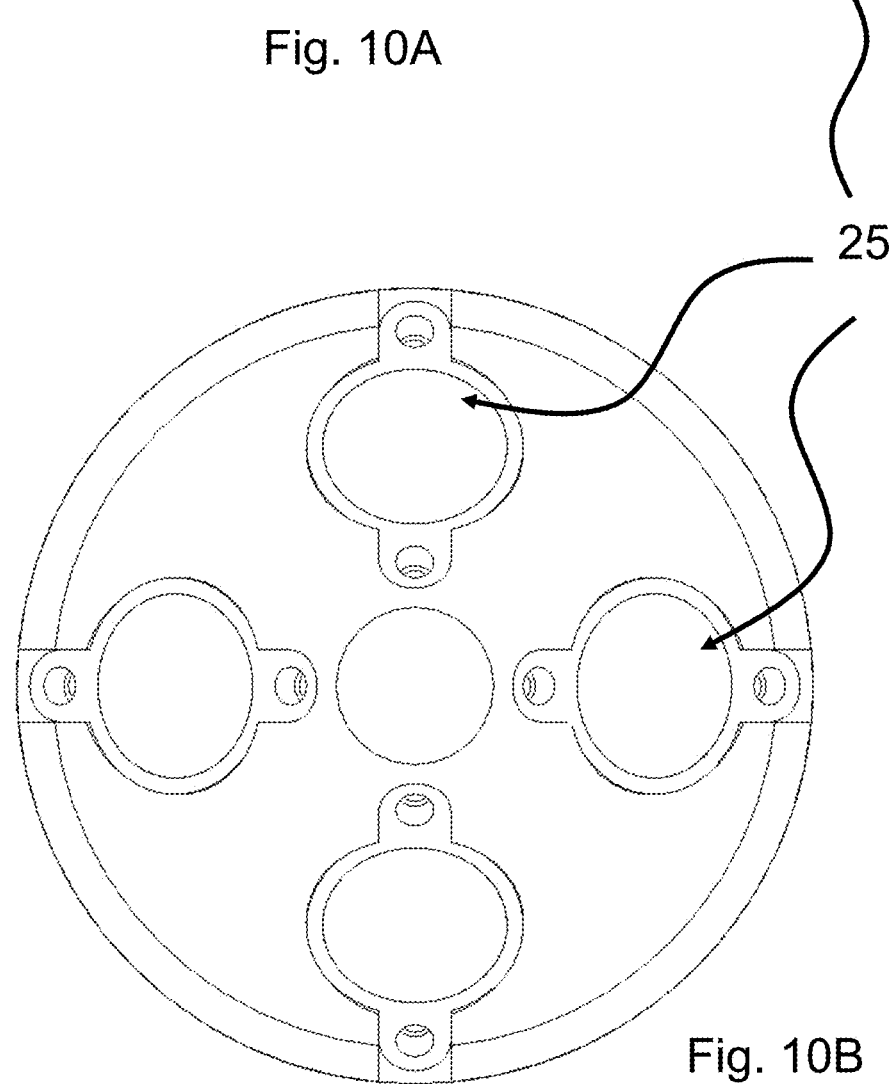
FIG. 10B is an end view of a Speed Module

In one embodiment, there are three or more Doppler sensors, preferably spaced equally radially around the module. In FIG. 10A/B, four Doppler sensors 25 are spaced 90° apart, focused on spaced-apart areas of the conduit. Data from each Doppler sensor can be combined to improve the speed estimate, by computing the average speed, providing redundancy, and being resilience to noise. Similarly, there may be three Doppler sensors spaced 120° apart, which is sufficient to determine the axial speed and estimate speed variations in both transverse directions.

The location/registration of image frames allows image processors to visualize the conduit more accurately. Image features are accurately scaled and located for modelling and analysis of the conduit. For example, determining the size and location of a perforation is important in oil wells, which depends on imaging that perf feature at plural frames of known distance apart (rather than the known time apart that is inherent to an imaging device), preferably with an accurate location relative to the well head.

Driving circuits 11 are generally available in ultrasound imaging and the skilled person is assumed to be familiar with chips, such as HV7360 from Microchip and LM96511 from Texas Instruments. Such chips drive plural ultrasound elements and receive reflections therefrom. Each scan line is converted from the analogue received signals to digital and reverse beamformed. They may have functions on-chip to process scan line data into B-mode (useful for imaging) or Doppler mode (useful for speed measurement).

It will be appreciated that data processing may be performed on one or more processors: on the imaging module, on the speed module, at the operations site, and on a remote computer. The term 'processor' is intended to include computer processors, cloud processors, microcontrollers, firmware, GPUs, FPGAs, and electrical circuits that manipulate analogue or digital signals. While it can be convenient to process data as described herein using software on a general computer, many of the steps could be implemented with purpose-built circuits or integrated circuits (ICs or ASICs).

Figure 7:
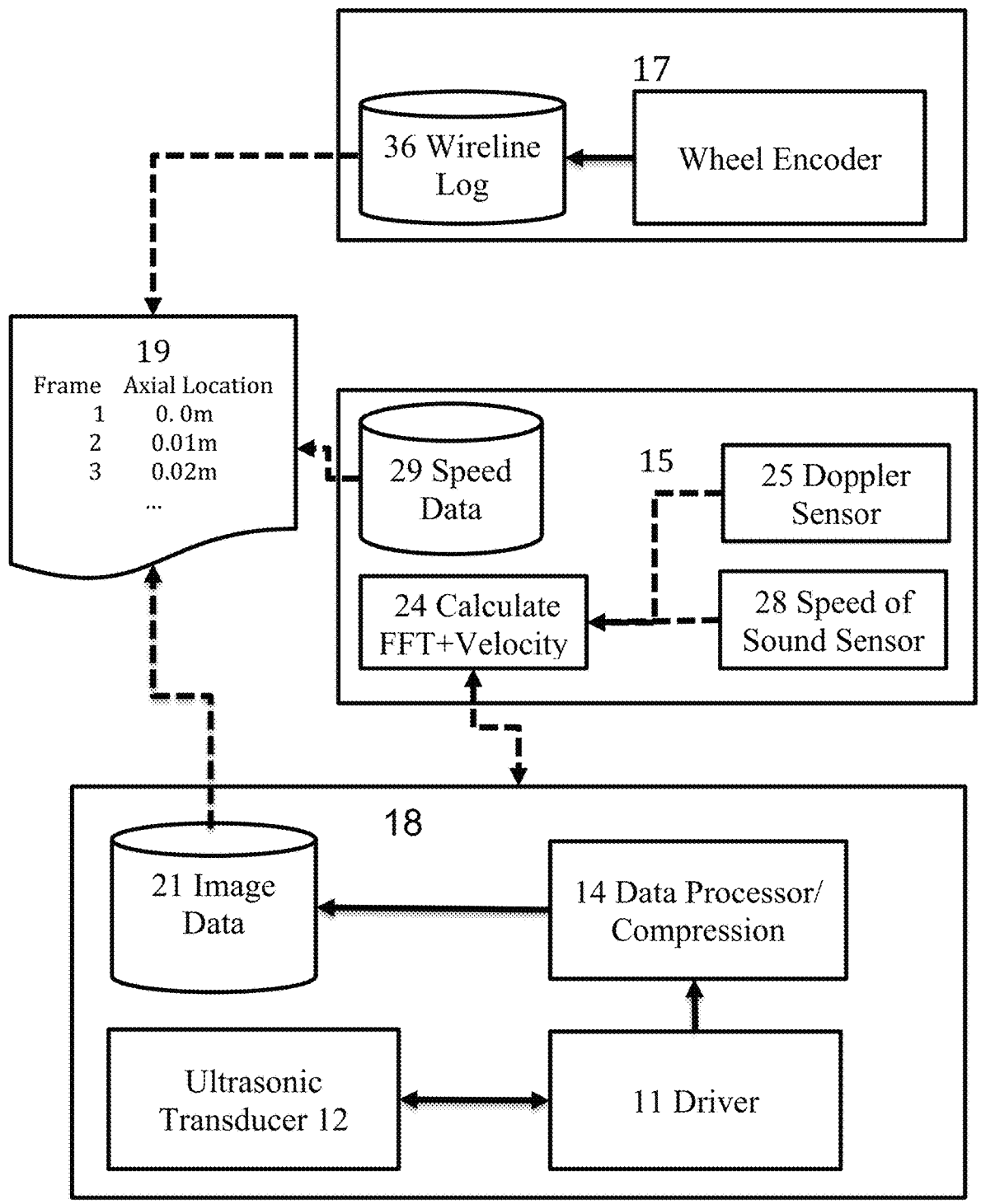
FIG. 7 is block diagram of processing components of the imaging system.
Figure 8:
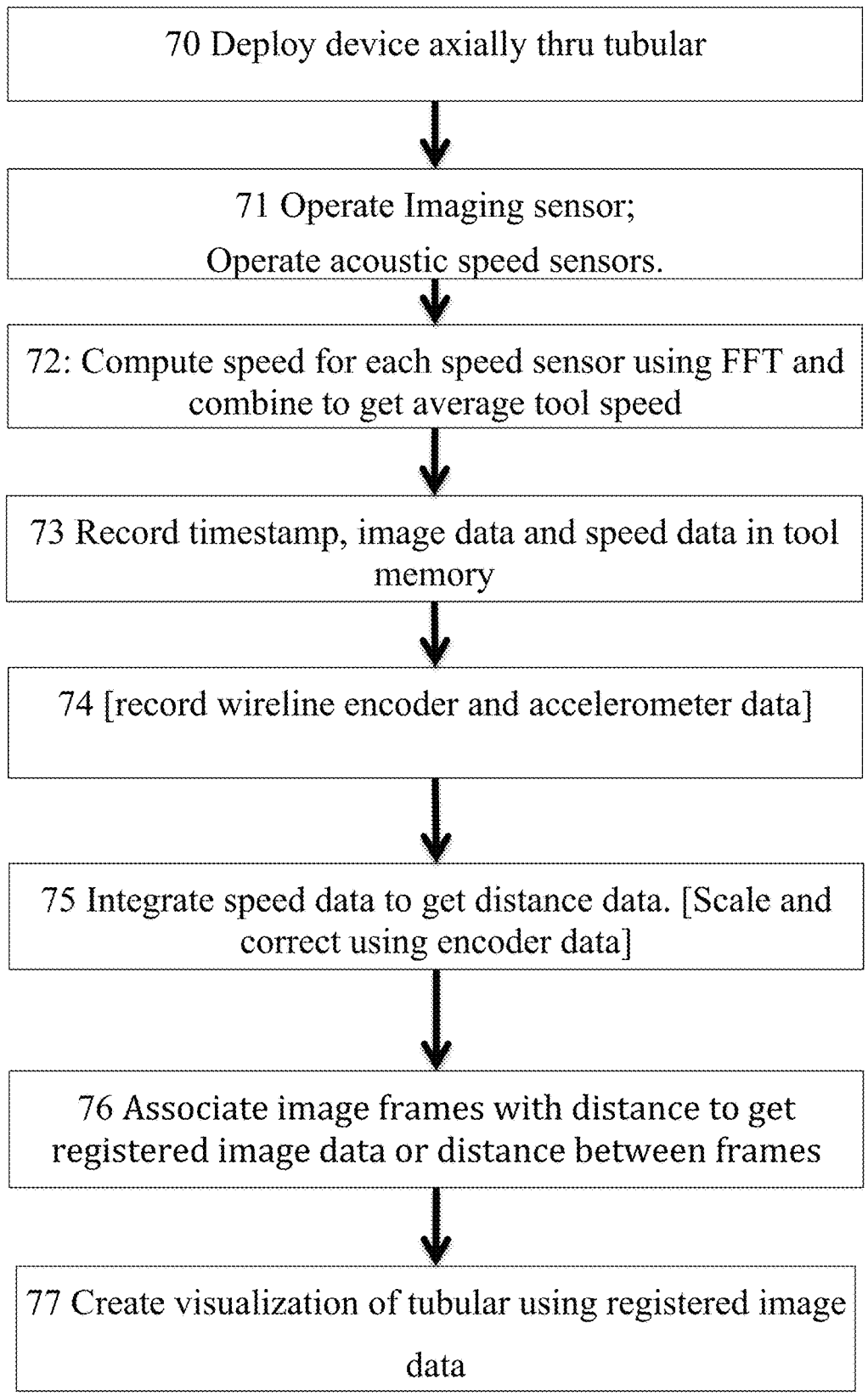
FIG. 8 is a flow diagram for registering image data.

In the example embodiment shown in FIG. 7, the imaging module's processing circuit 18 provides signal driving/conditioning, image data processing/compression and data storage, the speed module's circuit 15 processes and stores the speed data, while the remote processor 19 combines images, speeds, and timestamps to register images for visualization.

Imaging Transducers

The imaging module may comprise an array of acoustic or optical transducer elements These typically face radially-outward to capture the surface of the conduit, although rotating the sensor is possible and some sensors (ultrasound, seismic, X-ray, gamma ray sensors) may detect beyond the inner surface, into a cement bond or formation. As the device moves through the conduits, frames of the imaging sensors may be concatenated to create a massive image of the whole conduit.

The optical transducers may operate as a camera, preferably within the visible spectrum to capture images in clear fluids. This may be one or more 2D cameras or a line camera wrapped radially around the device.

Alternatively, the array may be acoustic transducers, preferably operating in the ultrasound band, preferably arranged as an evenly spaced one-dimensional radial array. The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection data from micron features. The transducers may be piezoelectric, such as the ceramic material, PZT (lead zirconate titanate). Such transducers and their operation are well known and commonly available. Circuits 11 to drive and capture these arrays are also commonly available.

The number of individual elements in the transducer array affects the azimuthal resolution of the generated images. Typically, each transducer array is made up of 32 to 2048 elements and preferably 128 to 1024 elements. The logging speed and frame rate determines the axial resolution, even though the exact location is not known without the registration step. Multiple transducer elements, per aperture, operate in a phase delayed mode to generate a scan line.

A ring-shaped imaging array arrangement captures a cross-sectional slice of the well covering 360° around the array 12 and is useful for thickness measurements. As the device is moved axially in the well or pipe, in either direction, the ring-shaped transducer continually captures slices of the well that are perpendicular to the longitudinal axis of the well.

In an alternative arrangement, the imaging array elements are distributed on a frustoconical surface with elements 13 facing partially in the longitudinal direction of the device, (and thus in the longitudinal direction when in the well). Thus, the radial transducers are angled uphole or downhole to form an oblique-shaped conical field of view.

Deployment System

Figure 6:
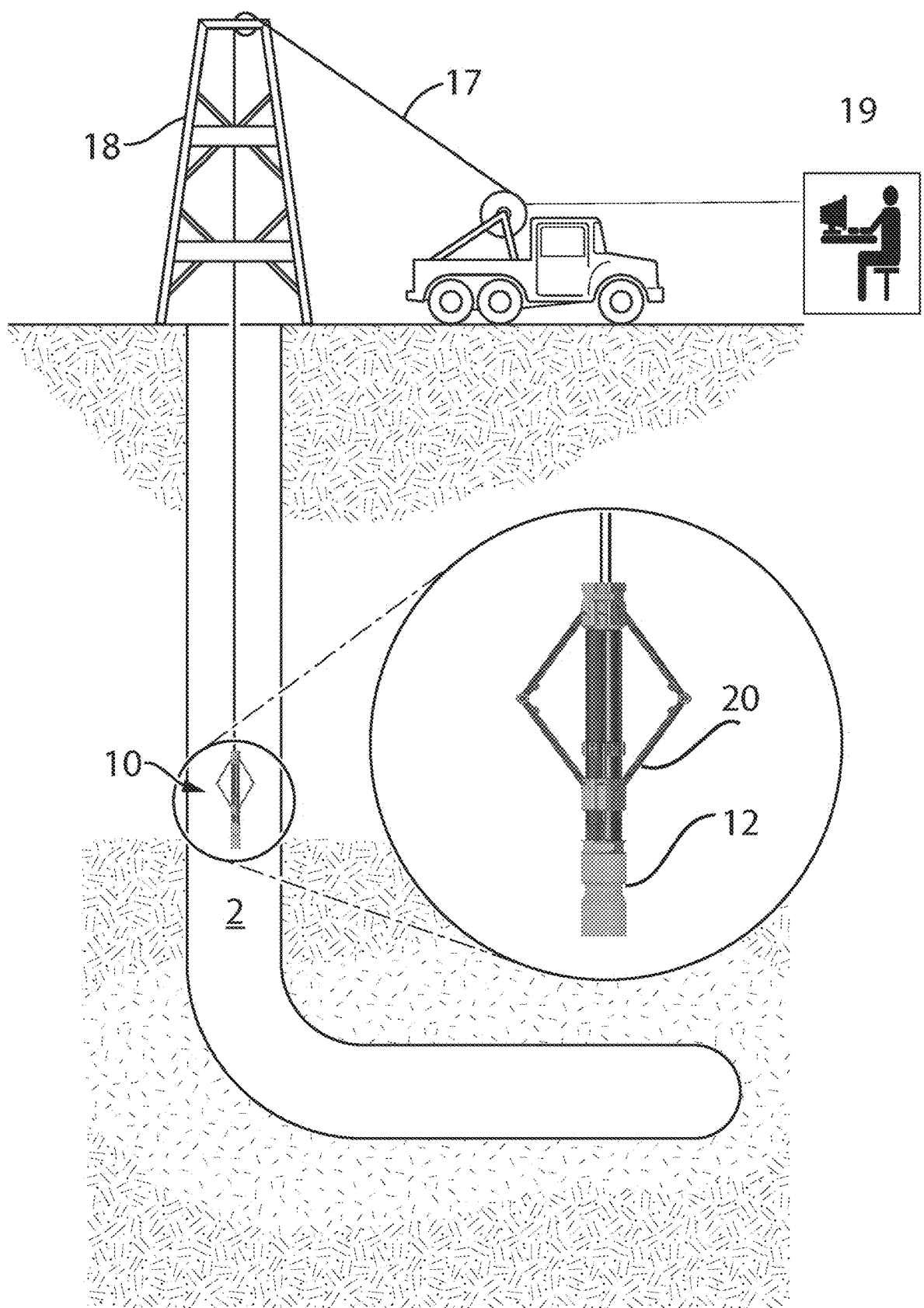
FIG. 6 is a cross-sectional view of an imaging tool deployed in a wellbore.

The imaging device includes a connection to a deployment system for running the imaging device 10 into the conduit 2 and removing the device. Generally, the deployment system is wireline 17, a tractor, or coiled tubing that may be specifically adapted for these operations as shown in FIG. 6. In pipelines, the device may be designed as a 'PIG' to move using flow and pressure differential within the pipe. The deployment system may have some way of tracking speed or location, but these are not accurate enough to register individual frames of the imaging sensor.

Centralizing

The imaging device 10 may include one or more centralizing elements for keeping the imaging device and speed module in the center of the conduit. FIG. 2 illustrates a device comprising a centralizer 20 with arms extend outwardly and abut the inner wall of the conduit to keep the device in the center of the well or pipe. They may be two centralizers, one before and one after the array to be centered.

The device is ideally concentric with the conduit, i.e. the longitudinal axis of the imaging device is perfectly aligned with the longitudinal axis of the conduit. Therefore scan lines radiate perpendicular out from the array, arrive perfectly focused at the conduit surface, and reflect back to the same transducers. The times of flight for every transmission to the well or pipe are thus ideally substantially the same.

However in reality, the device tends to be off-center of the well (i.e. the longitudinal axes are parallel but not aligned), a condition called eccentricity. This may be because the centralizers 20 are not working correctly, or the weight of the device pulls the device below the longitudinal axis of the pipe in horizontal orientations, such as the lower part of well 2 shown in FIG. 1. Also, the pipe itself may be non-circular (e.g. deformed) due to stresses applied to it.

Placing the centralizers near the imaging transducers and speed sensing module, improves their imaging clarity and speed accuracy.

Visualizations:

As discussed above, the speed data 29 may be used to register the location of image data 21, e.g. the (relative) axial position of the image frames in the tubular. Further corrections using additional sensors and data smoothing may be performed for the final image locations. Orientation of the tool (and thus of the tubular) may be known from gyroscopic sensors on the tool. A visualizer module programmed on a processor, such as the remote computer 19, may then build a physical model of the tubular using the image data, given their registered locations and optional orientations.

The visualizer may then choose image date from a section of the tubular selected by the user and render the section for display on a monitor. Thus not only is the tubular rendering and its features scaled more precisely using the Doppler-based location data, but the image points of the tubular selected is more precise.

By contrast, in prior systems, when a user requests to view from X meters to Y meters, image data would be retrieved from the datastore 21 based on frame timestamp or wireline estimate. It is possible that much of the retrieved data corresponds to a single location due to stick-slip and any features on the tubular would be axially stretched or compressed.

Terms such as "top", "bottom", "distal", "proximate" "downhole", "uphole", "below," "above," "upper, downstream," are used herein for simplicity in describing relative positioning of elements of the conduit or device, as depicted in the drawings or with reference to the surface datum. Although the present disclosure has been described and illustrated with respect to preferred embodiments and preferred uses thereof, it is not to be so limited since modifications and changes can be made therein which are within the full, intended scope of the disclosure as understood by those skilled in the art.

The invention claimed is:

1. A method of imaging a fluid conduit, comprising:
deploying and moving an imaging device axially through the conduit;
transmitting an acoustic wave axially and radially outward towards a surface of the conduit using an acoustic sensor operating in Doppler mode;
receiving a reflected wave from the surface using the acoustic sensor to generate reflection data;
processing the reflection data in Doppler mode to determine a relative speed of a wall of the conduit with respect to the imaging device;
capturing images of the conduit using an array of imaging sensors at a plurality of frames; and
using the determined relative speed to estimate distances between frames of the images.

2. The method of claim 1, wherein the array of imaging sensors comprises at least one of: an optical sensor array, ultrasound transducer array, array of calipers, x-ray sensor array, magnetic flux sensor array and eddy current sensor array.

3. The method of claim 1, wherein the captured images are cross-sectional slices of the conduit using the array of imaging sensors to create the plurality of frames, each having plural azimuthally separated scan lines.

4. The method of claim 1, wherein the acoustic sensor operates in Continuous Wave (CW) Doppler mode.

5. The method of claim 1, wherein the acoustic sensor operates in Pulsed Wave (PW) Doppler mode.

6. The method of claim 1, wherein the transmitted wave is directed toward the surface at an axial incidence angle of between 30 and 70°.

7. The method of claim 1, wherein the imaging device further comprises additional acoustic sensors radially-spaced around the imaging device for redundantly determining the relative speed of the wall with respect to the imaging device.

8. The method of claim 7, wherein the additional acoustic sensors are used to determine a lateral speed of the imaging device with respect to the wall of the conduit.

9. The method of claim 1, further comprising determining a Speed-of-Sound of fluid in the conduit using a Speed of Sound sensor of the imaging device exposed to fluid of the conduit for correcting the relative speed.

10. The method of claim 1 further comprising determining a plurality of relative speeds as the imaging device travels through the conduit, wherein the frames of the images are associated with first time stamps and each determined one of the plurality of relative speeds is associated with second time stamps.

11. The method of claim 10, wherein the estimated distances between frames are determined by integrating the determined plurality of relative speeds for reflection data received temporally close to those frames being captured.

12. An imaging device for a fluid conduit comprising:
an array of imaging sensors for capturing images;
at least one acoustic sensor facing axially and radially outward;
a processing circuit arranged to:
 a) drive the at least one acoustic sensor;
 b) receive a reflected wave to generate reflection data;
 c) process the reflection data in Doppler mode to determine a relative speed of the device; and
 d) determine distances between frames of the captured images based on the relative speed of the device.

13. The imaging device of claim 12, wherein the array of imaging sensor comprises at least one of: optical sensor array, ultrasound transducer array, array of calipers, x-ray sensor array, magnetic flux sensor array and eddy current sensor array.

14. The imaging device of claim 12, wherein the at least one acoustic sensor comprises transmitter and receiving elements facing the same direction.

15. The imaging device of claim 12, wherein the at least one acoustic sensor and the array of imaging sensors are located on separate tools, strung together on a tool string.

16. The imaging device of claim 12, wherein a transmitting element of the acoustic sensor is driven in Continuous Wave (CW) mode.

17. The imaging device of claim 12, wherein the acoustic sensor faces radially outward and inclined axially at an incidence angle of between 30 and 70°.

18. The imaging device of claim 12, wherein the at least one acoustic sensor comprises at least three acoustic sensors radially-spaced around the imaging device.

19. The imaging device of claim 12, further comprising a Speed of Sound sensor exposable to fluid of the conduit and operatively coupled to the processing circuit.

20. The imaging device of claim 12, wherein the processing circuit is further configured to:
   determine a plurality of relative speeds as the imaging device travels through the conduit; and
   integrate the determined plurality of relative speeds from the reflection data to estimate the distances between frames.

* * * * *